United States Patent [19]

Simone et al.

[11] Patent Number: 5,784,586
[45] Date of Patent: Jul. 21, 1998

[54] ADDRESSING METHOD FOR EXECUTING LOAD INSTRUCTIONS OUT OF ORDER WITH RESPECT TO STORE INSTRUCTIONS

[75] Inventors: Michael A. Simone, Sunnyvale, Calif.; Michael C. Shebanow, Plano, Tex.

[73] Assignee: Fujitsu Limited, Kawasaki, Japan

[21] Appl. No.: 517,229

[22] Filed: Aug. 21, 1995

Related U.S. Application Data

[63] Continuation of Ser. No. 388,389, Feb. 14, 1995, abandoned.
[51] Int. Cl.[6] .................................................. G06F 9/30
[52] U.S. Cl. .......................................................... 395/392
[58] Field of Search ......................... 364/DIG. 1 MS File, 364/DIG. 2 MS File; 395/250, 427, 444, 445, 468, 481, 800, 390, 391, 392, 393, 394, 395

[56] References Cited

U.S. PATENT DOCUMENTS 5,467,473  11/1995  Kahle et al. ........................ 395/800
5,557,763   9/1996  Senter et al. ....................... 395/800
5,606,670   2/1997  Abramson et al. ................. 395/250

Primary Examiner—Robert B. Harrell
Attorney, Agent, or Firm—Fenwick & West LLP

[57] ABSTRACT

A method of permitting out of order execution of load instructions with respect to older store instructions in a general purpose computer evaluates whether the same data bytes are being accessed by both the store and load instructions and if they are not the same, then out of order execution of the load with respect to the store instructions is permitted.

5 Claims, 3 Drawing Sheets

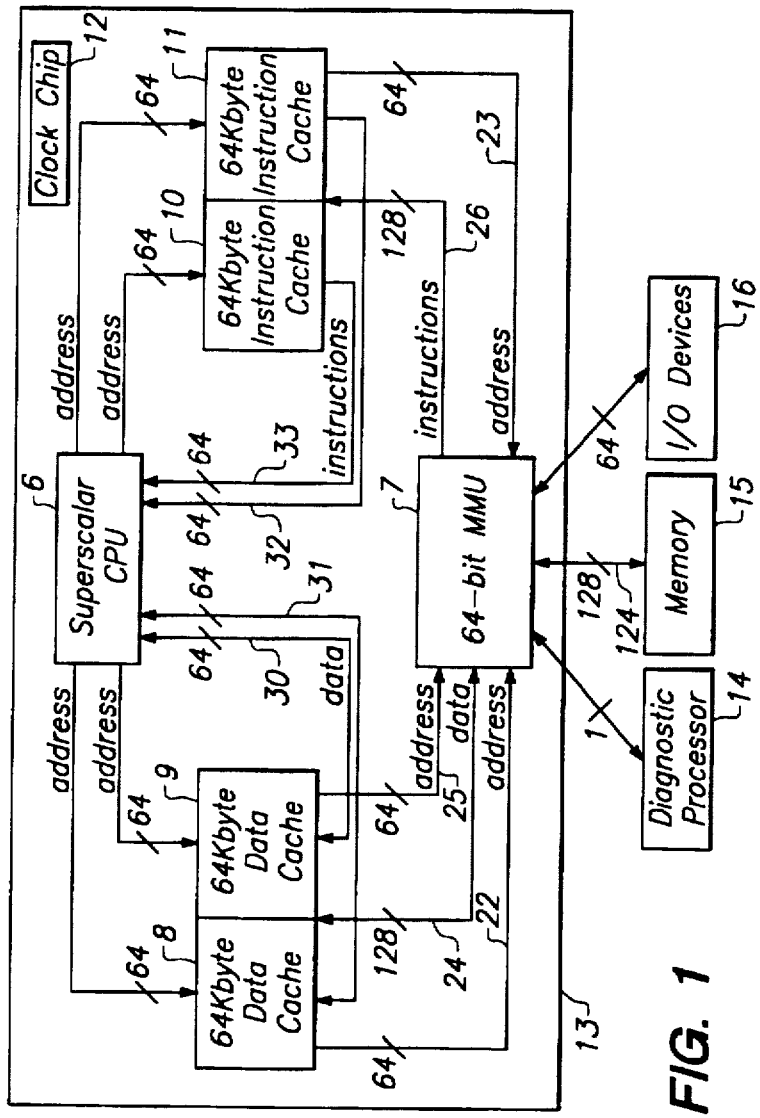
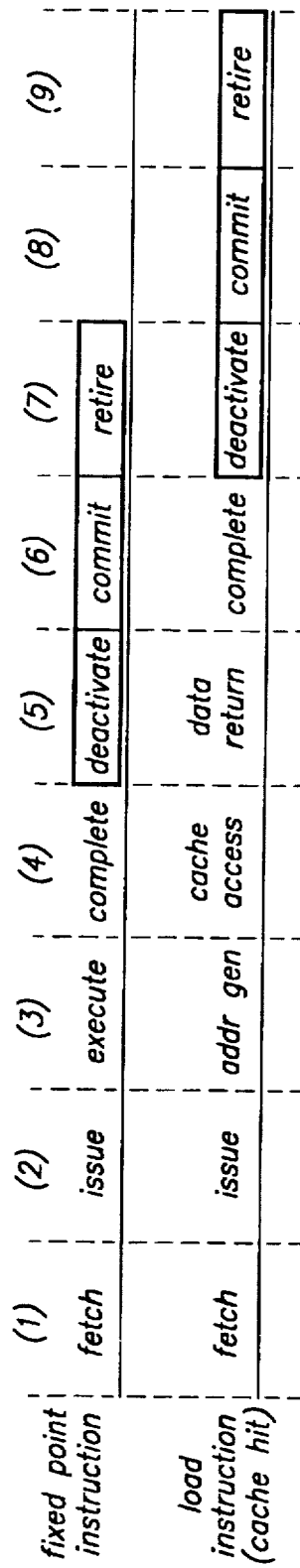
FIG. 1
FIG. 2

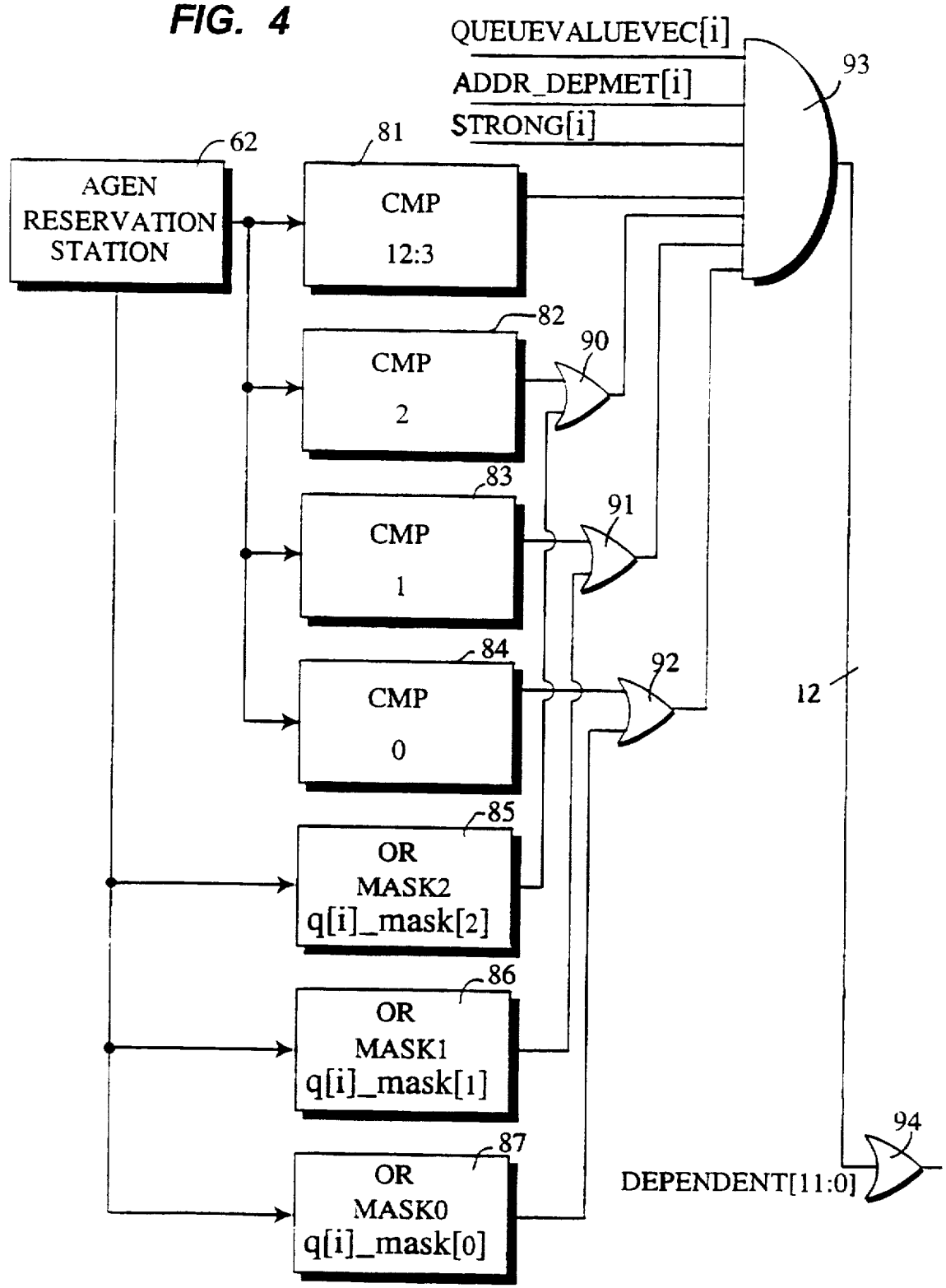

ADDRESSING METHOD FOR EXECUTING LOAD INSTRUCTIONS OUT OF ORDER WITH RESPECT TO STORE INSTRUCTIONS

CROSS-REFERENCE TO RELATED APPLICATIONS

This application is a continuation of copending U.S. patent application Ser. No. 08/388,389 filed Feb. 14, 1995, now abandoned, having the same title and inventors as the present application.

The subject matter of this application is related to subject matter of: (1) patent application Ser. No. 08/388,602 filed on Feb. 14, 1995, now issued U.S. Pat. No. 5,689,673; (2) patent application Ser. No. 08/388,606 filed on Feb. 14, 1995, now abandoned for continuation patent application Ser. No. 08/518,549 filed on Aug. 23, 1995, now abandoned for continuation application Ser. No. 08/921,104 filed on Aug. 29, 1997; (3) patent application Ser. No. 08/388,364 filed on Feb. 14, 1995, now abandoned for continuation patent application Ser. No. 08/516,230 filed on Aug. 17, 1995; and (4) patent application Ser. No. 08/390,885 filed on Feb. 14, 1995, now abandoned for continuation patent application Ser. No. 08/398,299 filed on Mar. 3, 1995, now abandoned for continuation patent application Ser. Nos.: 08/476,419 filed on Jun. 7, 1995, now issued U.S. Pat. No. 5,659,721; 08/478,025 filed on Jun. 7, 1995, now issued U.S. Pat. No. 5,651,124; 08/483,958 filed on Jun. 7, 1995, now issued U.S. Pat. No. 5,649,136; 08/473,223 filed on Jun. 7, 1995, now issued U.S. Pat. No. 5,644,742; 08/484,795 filed on Jun. 7, 1995, now issued U.S. Pat. No. 5,673,426; and 08/487,801 filed on Jun. 7, 1995, and its divisional patent application Ser. No. 08/872,982. The above patent applications are or will be assigned to the same assignee as herein, and are hereby incorporated herein by reference in their entirety.

FIELD OF INVENTION

This invention relates to a method for executing load instructions out of order with respect to store instructions in the central processing unit (CPU) of a computer system.

BACKGROUND OF THE INVENTION

SPARC-V9 architecture central processing units (CPU's) utilize 64-bit words. In present SPARC-V9 CPU's, accesses to memory, including storage of data to cache memory locations according to "store" instructions and loading of data from cache memory locations according to "load" instructions, is accomplished with 64-bit boundaries irrespective of actual instruction size. A "load" instruction occurring after a "store" instruction in the logical sequence of a selected software program may be executed out of order or "before" the store instruction which precedes it, but only if data in the same 64-bit word is not being accessed by both the load and the store instructions.

This approach does not take into account the size of the data being stored or loaded, which can be byte sized, half sized, word sized, or double word sized. A byte sized load or store is only 8 bits long. A half store or load is two bytes or 16 bits long. A word store or load is four bytes or 32 bits long. Finally, a double store or load is 8 bytes or 64 bits long. Merely because a load and store address the same 64 bit word, does not necessarily imply a collision or a dependency. The particular load or store may not exhaust the entire 64 bit memory location, unless either the load or store being compared is itself 64 bits or stored in the same part of the 64 bit memory location. However, according to the present approach, dependency is presumed if the same address location on a memory page is indicated, thereby foregoing enhanced efficiencies resulting from knowing for sure.

By not distinguishing between the data sizes relating to load and store instructions, current CPU methods are limited in instructions processed per cycle, by not being able to execute current load instructions prior to current store instructions in the same instruction queue, when the same word location is addressed, even when there is no collision within the same word location.

SUMMARY OF THE INVENTION

According to the present invention, a "load" instruction occurring after a "store" instruction in the logical sequence of a selected software program, is executable out of order, i.e., "before" the store instruction which precedes it, provided that data in the same regions of 64-bit word of memory is not being accessed by both the load and the store instructions. According to one embodiment of the present invention, the store instruction immediately precedes the load instruction in program order, but the load instruction is executed prior to the store instruction when the load instruction and the store instruction do not access the same byte of memory. Thus, according to the present invention, the CPU permits younger loads of a word size less than the standard size (e.g., 64 bits) to execute before older stores of a word size less than the standard size, provided that the memory locations accessed by the load and store instructions are not the same, according to byte or multi-byte size criteria. In particular, according to one embodiment, a comparison is undertaken to compare loads and stores by address and size. According to one embodiment, a size comparison determines whether either of a load and store being compared is 64 bits in length. According to another embodiment, the size comparison determines whether either of a load and store being compared is 32 bits in length. According to yet another embodiment, the size comparison determines whether either of a load and store being compared is 16 bits in length. According to even another embodiment, the size comparison determines whether either of a load and store being compared is 8 bits in length. Thus, the present invention determines whether to permit out of order execution of load instructions with respect to older store instructions in a general purpose computer by evaluating whether the same data bytes are being accessed by both the store and load instructions and if they are not the same, then out of order execution of the load with respect to the store instructions is permitted. Older instructions are those issued or arranged earlier in program sequence.

DESCRIPTION OF THE DRAWINGS

FIG. 1 is a diagram of a HaL R1 processor according to the present invention, implementing a SPARC V9 64-bit instruction set architecture having performance exceeding 256 SPECint92 and SPECfp92 at 154 MHz;

FIG. 2 is a diagram of the instruction pipelining method according to the present invention;

FIG. 4 is a diagram of the method of an embodiment of the present invention.

DESCRIPTION OF THE PREFERRED EMBODIMENT

Figure 3:
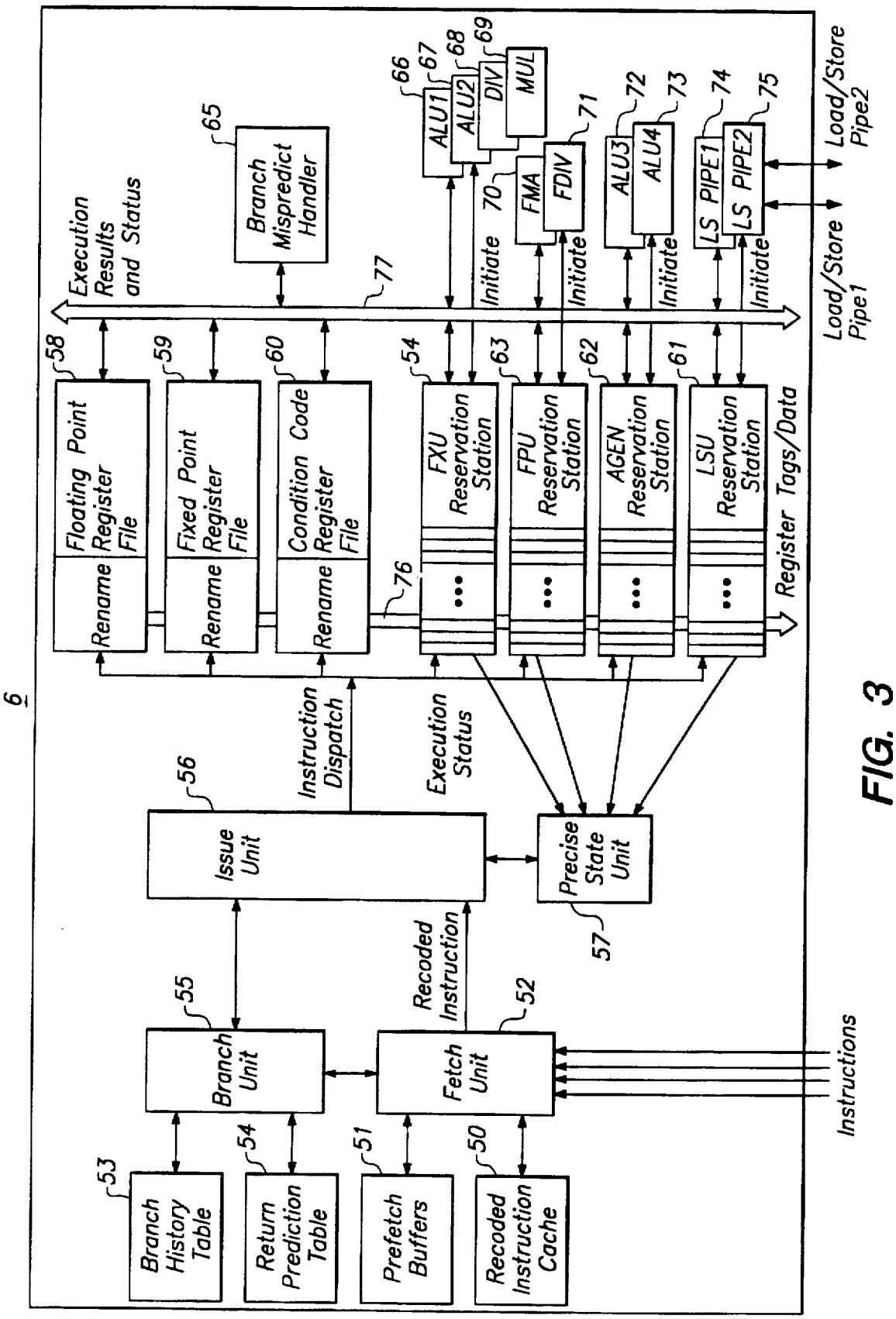
FIG. 3 is a block diagram of a central processing unit according to an embodiment of the present invention.

FIG. 1 shows a HaL R1 processor 5 according to the present invention, implementing a SPARC V9 64-bit instruction set architecture having performance exceeding 256 SPECint92 and SPECfp92 at 154 MHz. Processor 5 includes a superscalar central processing unit (CPU) 6, a memory management unit (MMU) 7, first through fourth cache chips respectively 8–11, and a clock chip 12. The various semiconductor chips included in processor 5 are fabricated in Fujitsu's twin well, 3.3 V, 0.4 μm CMOS process with 4 layers of metalization. The effective channel length of transistors on such semiconductor chips is approximately 0.35 μm. Three metal layers are reserved for signal routing in the semiconductor chips, while the fourth layer is reserved for bonding pads, global power, and clock routing. Processor 5 is mounted on a ceramic multi-chip module (MCM) 13 according to one embodiment of the present invention. Solder bump bonding technology is used to connect individual chips on MCM 13. Packaging in MCM form permits CPU 6 to utilize large caches and high bandwidth buses that total, according to one embodiment, 256 bits of address and 256 bits of data. Processor 5 further includes diagnostic processor 14, memory 15, and input output devices 16. Processor 5 uses methods according to the present invention including superscalar instruction issue, register renaming, and data flow execution with instruction-level parallelism. CPU 6 is connected to cache chips 8–11 with respective 64-bit lines 18–21. Cache chips 8 and 9 are data caches, and cache chips 10 and 11 are instruction caches. Address lines 22 and 23 respectively connect cache chips 8 and 11 to memory management unit 7. A 128-bit data line 24 connects cache chips 8 and 9 with memory management unit 7, and memory management unit 7 is in turn connected along an external 128-bit line 124 to memory 15, along a 1-bit line 125 to diagnostic processor 14, and along a 64-bit line to input output device(s) 16. Address line 25 connects cache chip 8 with memory management unit 7. Instruction line 26 connects memory management unit 7 with cache chips 10 and 11. 64-bit data lines 30 and 31 respectively connect CPU 6 with cache chips 8 and 9. 64-bit instruction lines 32 and 33 connect respective cache chips 10 and 11 with CPU 6.

FIG. 2 shows a diagram of instruction pipelining implemented with processor 5. Pipelining is implemented in four stages for fixed-point instructions, and in six stages for load instructions. According to the present invention, out-of-order execution of instructions is implemented with three additional stages including deactivate, commit, and retire steps added to the steps of fetch, issue, addr gen, cache access, data return, and complete, in the case of a load instruction with a cache hit; and the steps of fetch, issue, execute, and complete, in the case of a fixed point instruction. An instruction is deactivated after it has been completed without error. An instruction is committed if it has been deactivated and all previous instructions have been deactivated. An instruction is retired when all machine recourses consumed by the instruction have been reclaimed. Prior to commit and retire stages, instructions may be undone by processor 5 due to execution errors and branch mispredicts. Processor 5 provides a precise state.

FIG. 3 is a block diagram of CPU 6 including a direct mapped or recorded instruction cache 50, prefetch buffers 51, a fetch unit 52, a branch history table 53, a return prediction table 54, a branch unit 55, an issue unit 56, a precise state unit 57, register units 58–60, reservation stations 61–64, branch mispredict handler 65, arithmetic logic units ALU1 66 and ALU2 67, DIV unit 68, MUL unit 69, FMA unit 70, FDIV unit 71, arithmetic logic units ALU3 72 and ALU4 73, LSPIPE1 74, LSPIPE2 75, and buses 76 and 77. Register units 58–60 each include a rename subunit and respectively floating point, fixed point, and condition code register file subunits, and reservation stations 61–64 are respectively a FXU reservation station, a floating point (FPU) reservation station, a AGEN reservation station, and an LSU reservation station. Prefetch buffers 51 and recorded instruction cache 50 are connected to fetch unit 52. Branch history table 53 and return prediction table 53 are connected to branch unit 55 which in turn is connected to fetch unit 52. Both branch unit 55 and fetch unit 52 are connected to issue unit 56, the fetch unit 52 providing recorded instructions to issue unit 56. Precise state unit 57 is connected to issue unit 56 and to reservation stations 61–64. Issue unit 56 is connected to register units 58–60 and to reservation stations 61–64, and register units 58–60 and to reservation stations 61–64 are connected to bus 76 for registration of tags and data and to bus 77 for execution results and status. Branch mispredict handler 65, arithmetic logic units ALU1 66 and ALU2 67, DIV unit 68, MUL unit 69, FMA unit 70, FDIV unit 71, arithmetic logic units ALU3 72 and ALU4 73, LSPIPE1 74, and LSPIPE2 75. During operation in accordance with one embodiment of the present invention, four instructions are fetched from recorded instruction cache 50 by fetch unit 52 and provided to issue unit 56. To improve cycle time, instructions in recorded instruction cache 50 have already been partially coded or recoded. Branch history table 53 includes according to one embodiment 1024 entries and includes 2-bit saturating counters, which are used to predict the direction of branches. In order to accelerate subrouting reruns that also contain indirect branch targets, a rerun prediction table is used to predict the return address. Available machine resources and issue constraints are determined by issue unit 56. Up to four instructions are speculatively dispatched to four reservation stations 61–64. All instructions are issued in order. Generally, any combination of four fixed point, two floating point, two load store, or one branch instruction can be issued each cycle. Additionally, fixed point, floating point, and condition code registers are renamed in order to remove data hazards. Due to renaming of trap levels, traps detected during the issue stage can be entered speculatively. All dispatched instructions are assigned a unique 6-bit tag, resulting in a total of 64 outstanding instructions. In order to guarantee correctness, certain instructions such as branches are checkpointed by taking a snapshot of architectural state. A checkpoint can later be restored if a speculative instruction sequence is found to be issued or executed incorrectly due to a branch mispredict or an exception condition. Up to 16 checkpoints are available, allowing up to 16 levels of predicted branch instructions.

Once dispatched, an instruction awaits selection for execution in one of four reservation stations. Selection is based solely on dataflow principles of operand availability. As a result, instructions may execute out of order and are self-scheduling. A total of seven instructions can be selected for execution each cycle. The fixed point, address generation, and load store reservation stations are each able to initiate two instructions for execution, while the floating point reservation station is able to initiate one instruction. The floating point execution units comprise a four cycle pipelined multiply add unit and a 60 ns self-timed floating point divider. The integer execution units include a 64b multiplier, a 64b divider, and four arithmetic logic units (ALU's). Not including effects due to pipelining, a peak of 10 instructions can be executed in parallel. Load store unit (LSU) 61 is able to send speculative loads to the cache. If possible, loads are allowed to bypass stores or earlier loads. According to an embodiment of the present invention, LSU 61 performs two independent 64b loads or stores each cycle. As instructions complete execution, results are broadcast to reservation stations and status information is provided to precise state unit (PSU) 57. Up to nine instructions can complete in a cycle. PSU 57 tracks errors and completion status, and commits and retires instructions in order. Up to eight instructions can be committed and four instructions retired each cycle. PSU 57 also sequences external interrupts and exceptions.

LSU 61 is a twelve entry reservation station according to one embodiment of the present invention having i=12 positions for instruction addresses. LSU 61 includes a "queue" for the load/store instruction's addresses. Store or atomic instructions can have their addresses generated in any order. Load instructions must have their addresses generated in program order. When a load store instruction is issued to LSU 61, it is either allowed to execute out of order (weak situation) or it must execute in program order (strong situation). If a weak instruction is issued after a strong instruction, and it accesses the same byte(s) of memory as a previously executed strong instruction, the weak instruction must be turned into a strong instruction which must be executed in program order.

The following equation is used in accordance with one embodiment (i.e., a negative logic embodiment) of the present invention to establish whether an instruction that is generating its address in the current cycle is dependent on an older valid instruction that was issue strong which has already generated its address. By matching on only valid entries in the queue, false matches on previously executed instructions is avoided. By matching on only those instructions which were issued as strong, false matches on weak instructions are avoided. By matching on instructions which have already generated their addresses, false matches on valid, but stale addresses are avoided.

An instruction is dependent, and thus not able to execute out of order, if any of the 12 bits of MVB1, corresponding to the queue postions of the load store address reservation queue, are set to zero:

$$\begin{aligned}
MVB1[i] = &\{(\sim(MD1[12:3] == q[i][12:3]) \mid \\
&(\sim(MD1[2] == q[i][2]) \& \sim(q[i][18] \mid MASK1[2])) \mid \\
&(\sim(MD1[1] == q[i][1]) \& \sim(q[i][17] \mid MASK1[1])) \mid \\
&(\sim(MD1[0] == q[i][0]) \& \sim(q[i][16] \mid MASK1[0]))) \mid \\
&MDVAB1[i] \mid MDVBB[i]\};
\end{aligned}$$

where MD1[12:0] is the address being generated, where q[i][12:0] (i=0,11) are the addresses to compare against, where q[i][18:16] is the size of the instructions being compared, where MASK1[2:0] is the size of the instruction whose address is generated, where MDVAB1[i] indicates whether q[i] is valid and already generated, and where MDVBB1[i] indicates whether q[i] was strong when issued. These are the only valid values for q[i][18:16].

When MASK1[2:0]==3b111, the instruction in the queue accesses a 64 bit word in memory. It does not matter, if the lower three bits of the addresses match. If the other conditions are true, then the instruction is dependent. When MASK1[2:0]==3b011, the instruction in the queue accesses a 32 bit word in memory. It does not matter, if the lower two bits of the addresses match. If the other conditions are true, then the instruction is dependent. When MASK1[2:0]== 3b001, the instruction in the queue accesses a 16 bit word in memory. If the other conditions are true, then the instruction is dependent. When MASK1[2:0]==3b000, the instruction in the queue accesses an 8 bit word in memory. If the other conditions are true, then the instruction is dependent. These are the only valid values for MASK1[2:0].

When q[i][18:16]==3b111, the instruction in the queue accesses a 64 bit word in memory. It does not matter, if the lower three bits of the addresses match. If the other conditions are true, then the instruction is dependent. When q[i][18:16]==3b011, the instruction in the queue accesses a 32 bit word in memory. It does not matter, if the lower two bits of the addresses match. If the other conditions are true, then the instruction is dependent. When q[i][18:16]== 3b001, the instruction in the queue accesses a 16 bit word in memory. If the other conditions are true, then the instruction is dependent. When q[i][18:16]==3b000, the instruction in the queue accesses an 8 bit word in memory. If the other conditions are true, then the instruction is dependent.

According to an embodiment of the present invention, all of the lower 13 address bits of an instruction are checked according to the size of the instruction. This increases performance by allowing loads to bypass stores which are not truly dependent. For example, a load byte checks address [12:0] against a store byte, instead of address [12:3]. Accordingly, the register array stores the lower 16 bits of the address and a MASK for each instruction, to enable correct checking for four different sizes of loads and stores. Along with the address being generated in a selected cycle, the DFMLSU will also send a MASK for both addresses going into the LSADDRQ. The larger of the MASK in the queue and the MASK being inserted is used in the address[2:0] comparison. A 64 bit MASK equals 111; a 32 bit MASK equals 011; a 16 bit MASK equals 001; and an 8 bit MASK equals 000.

The following equation is used in accordance with another embodiment (i.e., a positive logic embodiment) of the present invention to establish whether an instruction that is generating its address in the current cycle is dependent on an older valid instruction that was issue strong which has already generated its address. Again, by matching on only valid entries in a load store address reservation queue having for example "i" positions, false matches on previously executed instructions is avoided. By matching on only those instructions which were issued as strong, false matches on weak instructions are avoided. By matching on instructions which have already generated their addresses, false matches on valid, but stale addresses are avoided.

An instruction is dependent, and thus not able to execute out of order, if any of the 12 bits of ADDR_DEPENDENT are set to one:

$$\begin{aligned}
ADDR\_DEPENDENT[i] = &\\
\{((AGEN[12:3] == &q[i][12:3]) \& \\
((AGEN[2] == q[i][2]) &\mid (q[i]\_mask[2] \mid MASK1[2])) \& \\
((AGEN[1] == q[i][1]) &\mid (q[i]\_mask[1] \mid MASK[1])) \& \\
((AGEN[0] == q[i][0]) &\mid (q[i]\_mask[0] \mid MASK[0]))) \& \\
QUEUEVALIDVEC[i] \& &ADDR\_DEPMET[i] \& STRONG[i]\};
\end{aligned}$$

where AGEN[12:0] is the address being generated, where q[i][12:0] (i=0,11) are the addresses to compare against, where q[i]_mask[2:0] is the size of the data associated with the instruction being compared with the instruction whose address is being generated, where MASK[2:0] is the size of the instruction whose address is generated, where QUEUEVALIDVEC[i] indicates whether q[i] is valid (i.e., issued but not executed, or, in other words, not "stale" or "old" by already having been executed), where ADDR_DEPMET[i] indicates whether address dependency has been met (i.e., whether the address upon which the dependent instruction depends has been generated), and where STRONG[i] indicates whether address q[i] was strong when issued.

FIG. 4 is a diagram of the method of an embodiment of the present invention. In particular, FIG. 4 shows AGEN reservation station 62 providing instruction addresses to respective address comparison elements 81, 82, 83, and 84, and instruction size indications MASK[i] and q[i]_mask[i] for comparison at OR stations 85, 86, and 87. Address comparison elements 81, 82, 83, and 84 and OR stations 85, 86, and 87 are each directly connected to AGEN reservation station 62. Address comparison element 82 and OR station 85 are connected to OR gate 90. Address comparison element 83 and OR station 86 are connected to OR gate 91. Address comparison element 84 and OR station 87 are connected to OR gate 92. Address comparison element 81, OR gates 90-92, QUEUEVALIDVEC[i], ADDR_DEPMET[i], and STRONG[i] are connected to AND gate 93, which in tun is connected to OR gate 94. Thus, OR gate 94 will receive a LOW input if the address being generated at AGEN reservation station 62 is dependent on any earlier other address in the load store queue, and OR gate 94 provides an indication of such a dependency condition, its output signal producing an indication that no out of order execution can be performed in that instance. The output of address comparison element 81 indicates whether the same 64-bit address in any memory page is being addressed by the instructions being compared. The output of OR gate 90 indicates whether the data associated with either instruction fills the entire similarly addressed 64-bit address or whether the third address bit of the instructions being compared are the same. The output of OR gate 91 indicates whether the data associated with either instruction fills a similarly addressed 32-bit address or whether the second address bit of the instructions being compared are the same. The output of OR gate 92 indicates whether the data associated with either instruction fills a similarly addressed 16-bit address or whether the first address bit of the instructions being compared are the same.

Thus, according to the present invention, in the following SPARC-V9 code sequence:

or %g0, 0×1, %g1
stb %g1, [%g0]
ldb [%g+0×1], %g2, the 8-bit load can execute out of order with respect to the store instruction, because it accesses a different byte of memory than the store.

What is claimed is:

1. In a central processing system including an instruction cache, an issue unit, one or more reservation stations, and a precise state unit, a method for executing load instructions out of order with respect to store instructions, comprising:

fetching a plurality of instructions from the instruction cache;

providing the fetched plurality of instructions to the issue unit;

dispatching the fetched plurality of instructions from the issue unit to each of the one or more reservation stations;

selecting from the one or more reservation stations one or more of the fetched plurality of instructions for execution;

executing one or more of the selected one or more fetched plurality of instructions; and broadcasting results of the fetched plurality of instructions that were executed to the precise state unit for tracking errors and completion status.

2. The method for executing load instructions out of order with respect to store instructions in claim 1, further comprising checking available machine resources and issue constraints in response to the issue unit receiving the fetched plurality of instructions.

3. The method for executing load instructions out of order with respect to store instructions in claim 1, further comprising:

checkpointing one or more of the fetched plurality of instructions with a snapshot of an architectural state; and restoring a checkpointed instruction from the one or more of the fetched plurality of instructions in response to a speculative instruction sequence being either issued or executed incorrectly.

4. A method of determining dependency of load and store instructions in a central processing unit of a general purpose computer by evaluating a relationship for "i" load and store instructions having addresses in a load store address queue having "i" instruction positions, where "i" is an integer value, to determine whether any bits of a register MVB1 are set to zero (indicative of dependency) in view of an address of a register MD1 being generated and an address of a register q(i) already generated and stored at location "i", the method comprising:

determining a logic condition of zero or false for MVB(i) in response to a last 10 bits of the address of MD1 being generated is not equal to a last 10 bits of the address of q(i) already generated, or a third bit of the address of MD1 being generated is not equal to a third bit of the address of q(i) already generated, and a nineteenth bit of the address of q(i) already generated and a third bit of a MASK being not set to a true condition, or a second bit of the address of MD1 being generated is not equal to a second bit of the address of q(i) already generated, and an eighteenth bit of the address of q(i) already generated and a second bit of the MASK being not set to a true condition, or a first bit of the address of MD1 being generated is not equal to a first bit of the address of q(i) already generated, and a sixteenth bit of the address of q(i) already generated and a first bit of the MASK being not set to a true condition, or in response to either MDVAB(i) or MDVBB(i) is set to a logic true condition, where MDVAB1(i) indicates whether the address of q(i) is valid and already generated, and where MDVBB1(i) indicates whether the address of q(i) was strong when issued;

identifying a dependency in response to the determined logic condition being zero or false: and preventing execution out of order in response to the identified dependency.

5. A method of determining dependency of load and store instructions in a central processing unit of a general purpose computer by evaluating a relationship for "i" load and store instructions having addresses in a load store address queue having "i" instruction positions, where "i" is an integer value, to determine whether any bits of a register ADDR_DEPENDENT are set to one (indicative of dependency) in view of an address of a register AGEN being generated and an address of a register q(i) already generated and stored at location "i", the method comprising:

determining a logic condition of one or true for ADDR DEPENDENT in response to a last 10 bits of the address of AGEN being equal to a last 10 bits of the address of q(i), and a third bit of the address of AGEN being equal to a third bit of the address of q(i), or either a third bit of a mask of q(i) or a third bit of a MASK being set to a logic true condition, and a second bit of the address of AGEN being equal to a second bit of the address of q(i), or either a second bit of a mask of q(i) or a second bit of the MASK being set to a logic true condition, and a first bit of the address of AGEN being equal to a first bit of an address of q(i), or either a first bit of a mask of q(i) or a first bit of the MASK being set to a logic true condition, and in response to the address of q(i) is valid and generated and an address dependency is met and the address of q(i) is strong when issued;

identifying a dependency in response to the determined logic condition being true or one: and preventing execution out of order in response to the identified dependency.

* * * * *